United States Patent
Moghaddasi et al.

(10) Patent No.: US 10,401,467 B2
(45) Date of Patent: Sep. 3, 2019

(54) SYSTEM AND METHOD FOR ESTIMATING THE DIRECTION OF ARRIVAL OF AN ELECTROMAGNETIC BEAM

(71) Applicant: Huawei Technologies Canada Co., Ltd., Kanata (CA)

(72) Inventors: Jaber Moghaddasi, Montreal (CA); Ke Wu, Montreal (CA)

(73) Assignee: Huawei Technologies Canada Co., LTD., Kanata (CA)

( * ) Notice: Subject to any disclaimer, the term of this patent is extended or adjusted under 35 U.S.C. 154(b) by 356 days.

(21) Appl. No.: 14/835,097

(22) Filed: Aug. 25, 2015

(65) Prior Publication Data

US 2017/0059685 A1    Mar. 2, 2017

(51) Int. Cl.
| | |
|---|---|
| *G01S 3/48* | (2006.01) |
| *H01Q 3/30* | (2006.01) |
| *G01S 3/04* | (2006.01) |
| *G01S 3/00* | (2006.01) |
| *H01Q 3/00* | (2006.01) |

(52) U.S. Cl.
CPC ............ *G01S 3/48* (2013.01); *G01S 3/043* (2013.01); *H01Q 3/30* (2013.01)

(58) Field of Classification Search
CPC ..... G01S 3/48; G01S 3/22; G01S 3/46; G01S 13/89; G01S 1/02; G01S 13/4409; G01S 13/4436; G01S 3/30; G01S 3/043; H01Q 3/26; H01Q 3/30
USPC ........................................ 342/149–154, 156
See application file for complete search history.

(56) References Cited

U.S. PATENT DOCUMENTS

| | | | | |
|---|---|---|---|---|
| 2,489,304 A | * | 11/1949 | Marchand et al. | ....... G01S 1/02 |
| 3,175,215 A | * | 3/1965 | Blasberg et al. | ... G01S 13/4436 |
| 3,209,355 A | * | 9/1965 | Livingston | .......... G01S 13/4409 |
| 3,438,044 A | | 4/1969 | Elia et al. | |
| 3,803,612 A | * | 4/1974 | Alcock | ...................... G01S 3/48 |
| | | | | 342/424 |
| 3,889,267 A | * | 6/1975 | Lucas | ....................... G01S 3/48 |
| | | | | 342/424 |
| 4,170,774 A | * | 10/1979 | Schaefer | ................... G01S 3/22 |
| 4,213,131 A | | 7/1980 | Kaiser, Jr. | |

(Continued)

FOREIGN PATENT DOCUMENTS

| | | |
|---|---|---|
| CN | 102435978 A | 5/2012 |
| CN | 103792509 A | 5/2014 |
| CN | 104020439 A | 9/2014 |

OTHER PUBLICATIONS

M. I. Skolnik, "Introduction to Radar Systems"; second edition; McGraw-Hill Book Company; New York, NY, USA; pp. 286-288; copyright in the year 1980; ISBN 0-07-057909-1. (Year: 1980).*

(Continued)

*Primary Examiner* — Bernarr E Gregory
(74) *Attorney, Agent, or Firm* — Slater Matsil, LLP

(57) ABSTRACT

A device for estimating a two-dimensional direction of arrival (DOA) of an electromagnetic beam includes an antenna system, and a signal processor operatively coupled to the antenna elements of the antenna system. The antenna system includes a plurality of antenna elements arranged in a rectangular planar array and configured to receive signal components of the electromagnetic beam. The signal processor estimates the two-dimensional DOA of the electromagnetic beam based on relative phases of the signal components of the electromagnetic beam.

23 Claims, 10 Drawing Sheets

(56) References Cited

U.S. PATENT DOCUMENTS

| | | | |
|---|---|---|---|
| 4,549,183 A * | 10/1985 | Farina | G01S 13/4436 |
| 4,630,051 A * | 12/1986 | Adams et al. | G01S 13/89 |
| 4,638,320 A | 1/1987 | Eggert et al. | |
| 4,717,916 A * | 1/1988 | Adams et al. | G01S 13/89 |
| 5,457,466 A | 10/1995 | Rose | |
| 5,657,027 A * | 8/1997 | Guymon, II | G01S 3/48 |
| 5,724,047 A | 3/1998 | Lioio et al. | |
| 5,742,252 A * | 4/1998 | Nguyen et al. | G01S 3/46 |
| 5,767,814 A | 6/1998 | Conroy et al. | |
| 5,852,420 A * | 12/1998 | Sezai | H01Q 3/26 342/382 |
| 5,936,575 A * | 8/1999 | Azzarelli et al. | G01S 3/48 |
| 5,940,029 A * | 8/1999 | Ninomiya et al. | G01S 13/4409 |
| 5,955,990 A * | 9/1999 | Acoraci et al. | G01S 3/46 |
| 6,127,974 A | 10/2000 | Kesler | |
| 6,377,214 B1 * | 4/2002 | Melville, II et al. | G01S 3/48 |
| 8,334,808 B2 | 12/2012 | Remez et al. | |
| 2011/0215963 A1 * | 9/2011 | Perl | G01S 3/30 |
| 2011/0304508 A1 | 12/2011 | Remez et al. | |
| 2015/0070217 A1 * | 3/2015 | Sharawi et al. | G01S 3/043 342/445 |

OTHER PUBLICATIONS

Xiong et al., "DOA Estimation Based on Phase-Difference," 2006 8th International Conference on Signal Processing, Nov. 16-20, 2006, 4 pages, vol. 1., Beijing.

Koelpin, A., et al., "The Six-Port Technology: A Low-Cost Concept for Precise Position Measurements," 9th International Multi-Conference on Systems, Signals and Devices, Systems, Signals and Devices (SSD), Mar. 20-23, 2012, 5 pages.

Laemmle, B., et al., "A 77-GHz SiGe Integrated Six-Port Receiver Front-End for Angle-of-Arrival Detection," IEEE Journal of Solid State Circuits, vol. 47, No. 9, Sep. 2012, pp. 1966-1973.

Remez, J., et al., "Low-Loss Wideband Multimodal Interferometric Antenna for DOA in Azimuth and Elevation," IEEE Antennas and Wireless Propagation Letters, vol. 8, Jun. 12, 2009, pp. 898-902.

Tatu, S. O., et al., "A New Beam Direction Finding Circuit Based on Six Port Technology," Microwave Symposium Digest, Jun. 12-17, 2005, pp. 581-584.

Vinci, G., et al., "Wide-Range, Dual Six-Port based Direction-of-Arrival Detector," Microwave Conference (GeMiC), Mar. 12-14, 2012, 4 pages.

Vinci, G., et al., "A Novel, Wide Angle, High Resolution Direction-Of-Arrival Detector," Proceeding of the 8th European Radar Conference, Manchester, UK, Oct. 12-14, 2011, pp. 265-268.

* cited by examiner

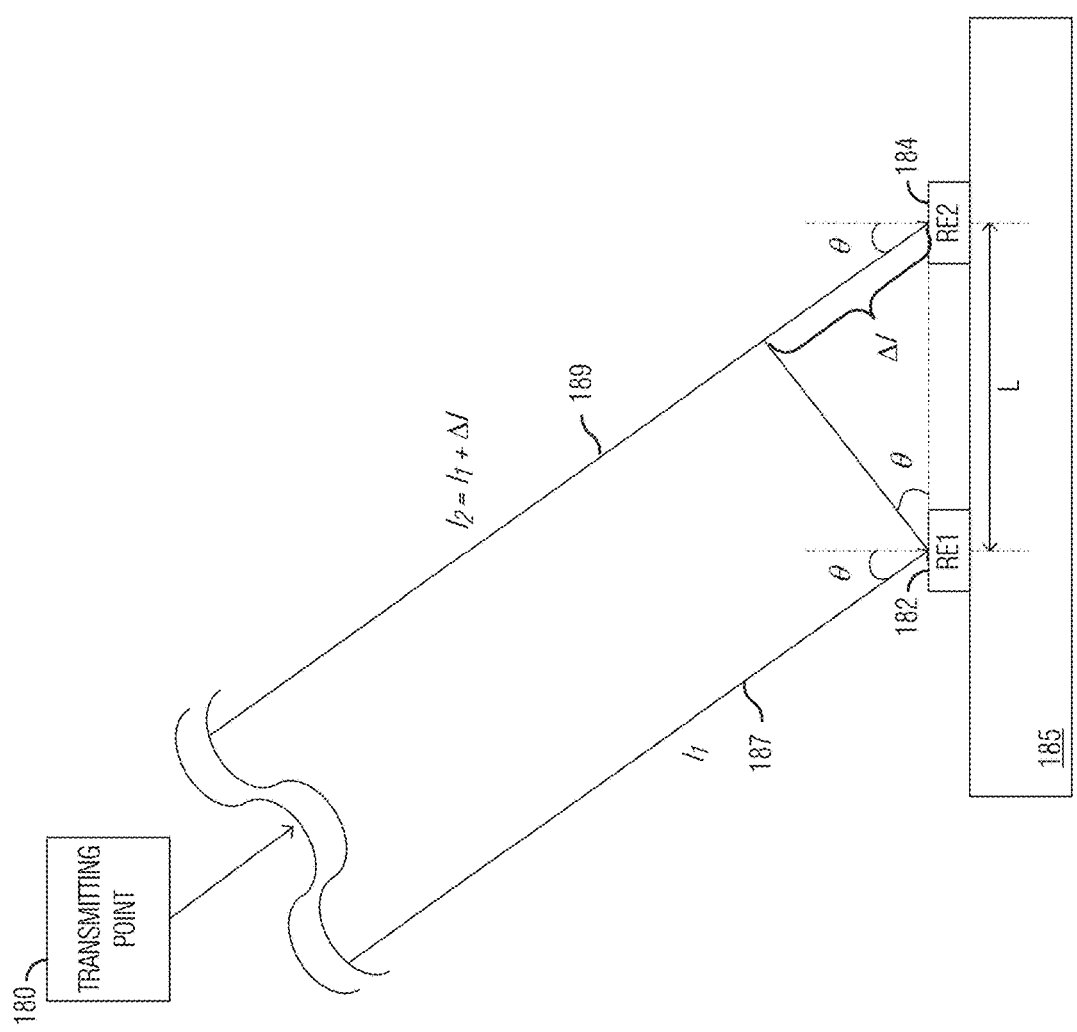

SYSTEM AND METHOD FOR ESTIMATING THE DIRECTION OF ARRIVAL OF AN ELECTROMAGNETIC BEAM

TECHNICAL FIELD

The present disclosure relates generally to communications systems using electromagnetic beams, and more particularly to a system and method for estimating the direction of arrival (DOA) of an electromagnetic beam.

BACKGROUND

Direction of arrival (DOA) estimation has been an active area of research. DOA estimation has been used in a wide range of applications, including radar, sonar, electronic surveillance, and seismic exploration. DOA estimation is also becoming important in the communications field, such as in mobile device communications.

DOA estimation has typically been realized through mechanical or electrical solutions. Mechanical solutions usually involve a single receive antenna that rotates around horizontal or vertical axes to scan the vertical or azimuth planes. Electrical solutions may make use of large numbers of receive antennas, as well as analog or digital beamforming to find the spatial direction of the incoming electromagnetic beams. Therefore, there is a need for a simple system and method for estimating the DOA in two dimensions of an electromagnetic beam that do not require complex mechanical and/or electrical structures or large numbers of receive antennas.

SUMMARY OF THE DISCLOSURE

Example embodiments provide a system and method for estimating the direction of arrival (DOA) of an electromagnetic beam.

In accordance with an example embodiment, a device is provided for estimating a two-dimensional direction of arrival (DOA) of an electromagnetic beam. The device includes an antenna system, and a signal processor operatively coupled to the antenna elements of the antenna system. The antenna system includes a plurality of antenna elements arranged in a rectangular planar array and configured to receive signal components of the electromagnetic beam. The signal processor estimates the two-dimensional DOA of the electromagnetic beam based on relative phases of the signal components of the electromagnetic beam.

In accordance with another example embodiment, a method is provided for estimating a two-dimensional direction of arrival (DOA). The method includes receiving, by a device, signal components of an electromagnetic beam at an antenna system comprising a plurality of antenna elements arranged in a rectangular planar array, and estimating, by the device, the two-dimensional DOA of the electromagnetic beam based on relative phases of the signal components of the electromagnetic beam.

In accordance with another example embodiment, a device is provided for estimating a two-dimensional direction of arrival (DOA) of an electromagnetic beam. The device includes an antenna system, a processing unit operatively coupled to the antenna system, and a computer readable storage medium storing programming for execution by the processing unit. The antenna system includes a plurality of antenna elements arranged in a rectangular planar array. The antenna system receives signal components of the electromagnetic beam. The programming including instructions to configure the device to estimate the two-dimensional DOA of the electromagnetic beam based on relative phases of the signal components of the electromagnetic beam.

BRIEF DESCRIPTION OF THE DRAWINGS

For a more complete understanding of the present disclosure, and the advantages thereof, reference is now made to the following description taken in conjunction with the accompanying drawings, in which:

FIG. 1C illustrates phase differences in signal components of an electromagnetic beam as received at a plurality of receive elements according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the embodiments presented herein, and do not limit the scope of the disclosure.

One embodiment relates to estimating a direction of arrival (DOA) of an electromagnetic beam. A DOA in three-dimensions may be expressed in two angular component parts, referred to as angles of arrival (AOA). As an illustrative example, a device for estimating a direction of arrival (DOA) of an electromagnetic beam includes an antenna system with a plurality of antenna elements arranged in a rectangular planar array and a signal processor operatively coupled to the antenna elements of the antenna system. The antenna system receives signal components of the electromagnetic beam. The signal processor estimates the DOA of the electromagnetic beam based on relative phases of the signal components of the electromagnetic beam.

The embodiments will be described with respect to example embodiments in a specific context, namely communications systems that use estimates of DOA of an electromagnetic beam for antenna beam alignment, object positioning, data communications using smart antenna systems, and the like. The embodiments may be applied to standards compliant communications systems, such as those that are compliant with Third Generation Partnership Project (3GPP), IEEE 802.11, and the like, technical standards, and non-standards compliant communications systems, that use estimates of DOA of an electromagnetic beam.

Figure 1B:
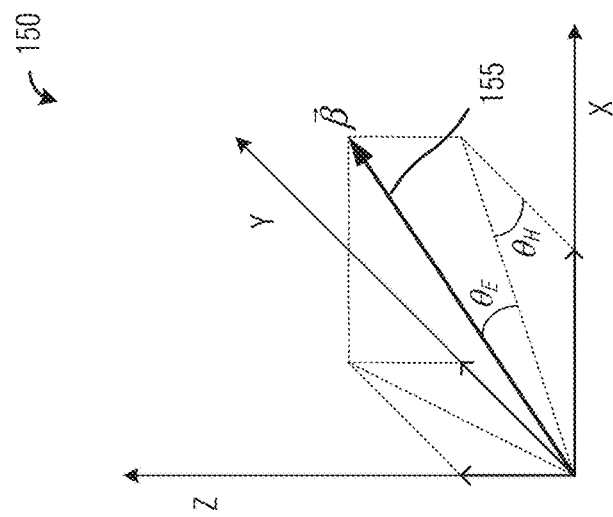
FIG. 1B illustrates an example propagation vector of a plane wave (an electromagnetic beam) according to example embodiments described herein.
Figure 1A:
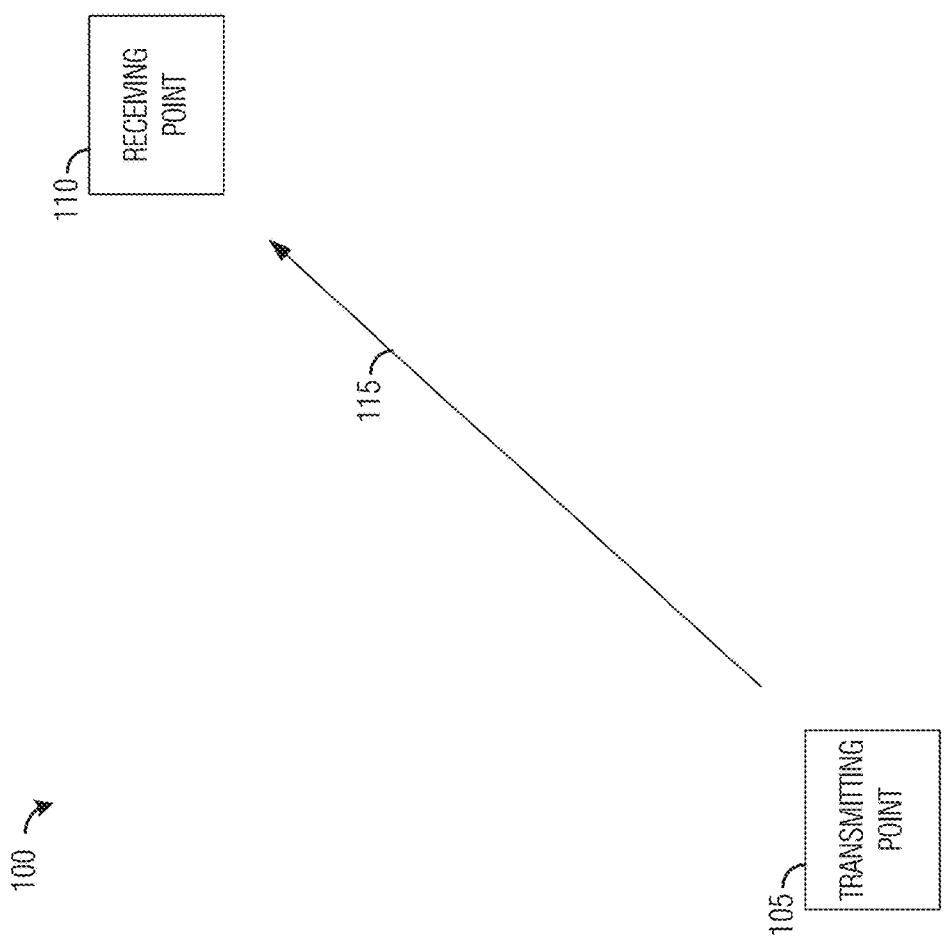
FIG. 1A illustrates an example communications system according to example embodiments described herein.

FIG. 1A illustrates an example communications system 100. Communications system 100 includes a transmitting point 105 and a receiving point 110. Transmitting point 105 uses one or more transmit antennas to transmit an electromagnetic beam 115 to receiving point 110. Similarly, receiving point 110 uses one or more receive antennas to receive beam 115. The one or more receive antennas may be directed in accordance with a DOA of electromagnetic beam 115 to help improve receive performance. As illustrative examples, the one or more receive antennas may be oriented in such a way with respect to the DOA of electromagnetic beam 115 as to maximize spatial diversity performance, transmit antennas of receiving point 110 may be oriented back towards the DOA of electromagnetic beam 115 to maximize transmit performance of receiving point 110 back to transmitting point 105, or transmit antennas of receiving point 110 may be configured to generate a beam oriented back towards the DOA of electromagnetic beam 115 using analog and/or digital beamforming techniques to maximize transmit performance for receiving point 110 with respect to transmitting point 105. Therefore, there is a need for a simple system and method for estimating the DOA of an electromagnetic beam. While it is understood that communications systems may employ multiple transmit points and receive points, only one transmit point and one receive point are illustrated for simplicity.

FIG. 1B illustrates diagram 150 of an example propagation vector 155 of a plane wave (an electromagnetic beam). In general, any plane wave traveling in a specific direction is expressible in the time domain as:

$$\vec{\varepsilon}(x,y,z,t) = Re\{\vec{E}(x,y,z)e^{j\omega t}\} = Re\{E_o e^{-j\vec{\beta}\cdot\vec{r}} e^{j\omega t}\} = E_o \cos(\omega t - \vec{\beta}\cdot\vec{r}). \quad (1)$$

The plane wave (as expressed in Equation (1)) arrives at receive antennas of a receiving point, where $\vec{r} = a\vec{x} + b\vec{y} + c\vec{z}$ is a position vector of any node in the Cartesian coordinate system, i.e., (a,b,c), and $\vec{\beta} = \beta_x \vec{x} + \beta_y \vec{y} + \beta_z \vec{z}$ is a wave propagation vector of the plane wave in the same coordinate system. As shown in FIG. 1B, $\vec{\beta}$ forms an azimuth angle $\theta_H$ and an elevation angle $\theta_E$ with respect to a normal vector of the receive antennas, i.e., $\vec{n} = 0\vec{x} + 1\vec{y} + 0\vec{z}$. Therefore, components of propagation vector 155 projected on a Cartesian coordinate system may be expressed as:

$\beta_x = \beta_o \cos\theta_E \sin\theta_H,$ $\beta_y = \beta_o \cos\theta_E \cos\theta_H,$ $\beta_z = \beta_o \sin\theta_E$ \quad (2)

where $\beta_o$ is the magnitude of $\vec{\beta}$ and is expressed as $\beta_0 = 2\pi f/c$ where f and c are the wave frequency and velocity of light in free space, respectively.

FIG. 1C is a diagram 175 showing phase differences in signal components of an electromagnetic beam as received at a plurality of receive elements. FIG. 1C illustrates the phase differences in a two-dimensional space to simplify discussion; however, the concepts shown in FIG. 1C also apply in three-dimensional space. In the far field, an electromagnetic beam sent by transmission point 180 arrives at a first receive element (RE1) 182 and a second receive element (RE2) 184 of a planar array 185 with the same (or substantially the same) DOA θ. Although the electromagnetic beam arrives at the plurality of receive elements with the same DOA θ, the paths between transmission point 180 and the individual receive elements are different. As an illustrative example, a first path 187 between transmission point 180 and RE1 182 is of length $l_1$ while a second path 189 between transmission point 180 and RE2 184 is length $l_2$. Since RE1 182 is closer to transmission point 180 than RE2 184, $l_1$ is shorter than $l_2$ by length Δl. The difference in the lengths of the paths between transmission point 180 and the receive elements give rise to phase differences that are utilized to estimate the DOA of the electromagnetic beam sent by transmission point 180.

Figure 2:
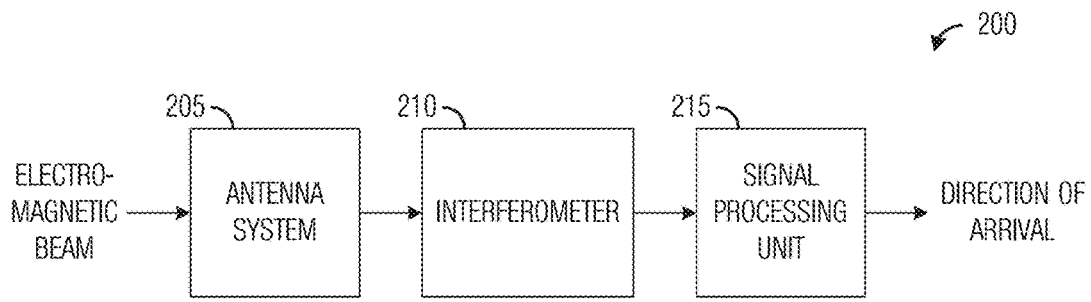
FIG. 2 illustrates a high-level view of an example detection system for estimating a DOA of an electromagnetic beam according to example embodiments described herein.

FIG. 2 illustrates a functional block diagram of an example detection system 200 for estimating a DOA of an electromagnetic beam. Detection system 200 includes an antenna system 205, an interferometer 210, and a signal processing unit 215. Antenna system 205 includes one or more antennas. Antenna system 205 includes a plurality of receive elements and is configured to receive signal components of the electromagnetic beam at different receive elements. Interferometer 210 is configured to mix the superposed signal components of the received electromagnetic beam and produce output signals. In general, an interferometer comprises a mixing unit and a passive junction which is a network of couplers and phase shifters. The mixing unit may be realized using diode or transistor circuitry. The passive junction may be characterized using a scattering matrix, which specifies amplitude and phase relationships of signals arriving at the input ports of the interferometer compared to signals departing the output ports of the interferometer. Signal processing unit 215 is configured to process the output signals produced by interferometer 210 to estimate the DOA of the electromagnetic beam. Signal processing unit 215 utilizes the relative phases of the signal components of the received electromagnetic beam in the estimation of the DOA. In other words, the phase differences between the signal components of the received electromagnetic beam are used in the estimation of the DOA. In a three-dimensional space, the DOA of an electromagnetic beam comprises two component angles of arrival (AOA), for example an azimuth AOA and an elevation AOA. Detailed discussions of example embodiments of antenna system 205, interferometer 210, and signal processing unit 215 are provided below.

Figure 3:
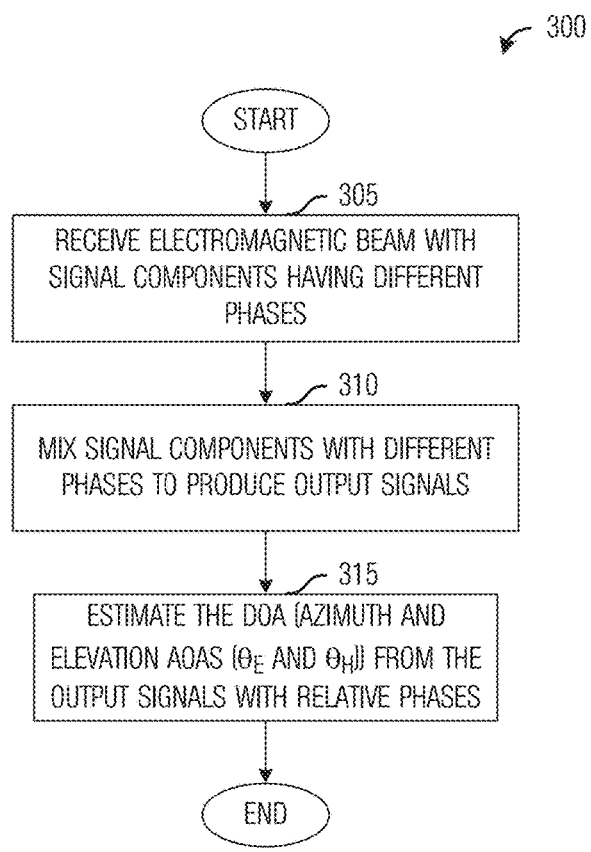
FIG. 3 illustrates a flow diagram of example operations occurring in a detection system estimating a DOA of an electromagnetic beam according to example embodiments described herein.

FIG. 3 illustrates a flow diagram of example operations 300 occurring in a detection system estimating a DOA of an electromagnetic beam. Operations 300 may be indicative of operations occurring in a detection system, such as detection system 200, as the detection system estimates a DOA of an electromagnetic beam.

Operations 300 begin with the detection system receiving signal components of an electromagnetic beam with an antenna system (block 305). The antenna system includes a plurality of receive elements. The plurality of receive elements receives the signal components of the electromagnetic beam in such a way that information usable in estimating the DOA of the electromagnetic beam is present in the signal components of the received electromagnetic beam. The detection system mixes the signal components and produces output signals (block 310). An interferometer of the detection system mixes the superposed signal components of the received electromagnetic beam in order to obtain the relative phases related to the DOA of the electromagnetic beam. The detection system estimates the DOA based on the relative phases (block 315). The estimation of the DOA of the electromagnetic beam may be performed by an estimating unit of the detection system. The estimating unit may be implemented in a signal processor, for example.

According to an example embodiment, signal components of an electromagnetic beam are received at a plurality of receive elements of an antenna system. The plurality of receive elements of the antenna system are arranged in a rectangular planar array.

According to an example embodiment, the signal components of the received electromagnetic beam are mixed in order to obtain output signals having relative phases.

According to an example embodiment, the output signals with the relative phases are processed in order to estimate the DOA of the electromagnetic beam.

Figure 4A:
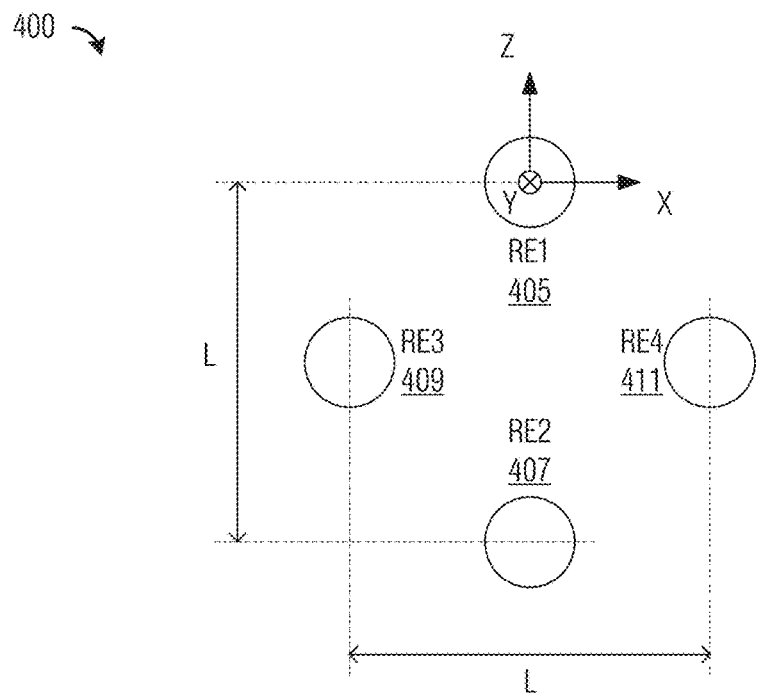
FIG. 4A illustrates a first example embodiment of an antenna system according to example embodiments described herein.

FIG. 4A illustrates a first example embodiment of an antenna system 400. Antenna system 400 includes a plurality of independent receive elements arranged in a rectangular shape, forming a planar array with all of the independent receive elements in a single plane. The independent receive elements may have linear polarization. The independent receive elements may be omnidirectional, or directional with the directionality of the independent receive elements being dependent upon an operational range of DOA detection that the detection system is expected to be able to unambiguously detect. The independent receive elements may be patch antennas. As an illustrative example, the plurality of independent receive elements includes four independent receive elements. The four independent receive elements of antenna system 400 are arranged in a configuration with a first pair oriented along a horizontal axis and a second pair oriented along an elevation axis all in a single plane, with each pair separated by a distance L. The configuration of the receive elements presents different paths for the electromagnetic beam to reach the receive elements. Different configurations of the receive elements result in different paths.

The configuration of the receive elements of antenna 400 may be described as a square or a diamond shape. The distance L may be determined based on design criteria, such as the operational range of DOA detection that the detection system is expected to be able to unambiguously detect, size limitations on the detection system, manufacturing limitations, and so on. As an illustrative example, a detection system with a relatively small operational range of DOA detection (such as from −20 degrees to +20 degrees) may have a larger value of L as a fraction of electromagnetic beam wavelength than a detection system with a relatively large operational range of DOA detection (such as from −90 degrees to +90 degrees), however, size limitations on the overall detection system may require that L be smaller. The respective receive elements of antenna system 400 are labeled receive element 1 (RE1) 405, RE2 407, RE3 409, and RE4 411.

Figure 4B:
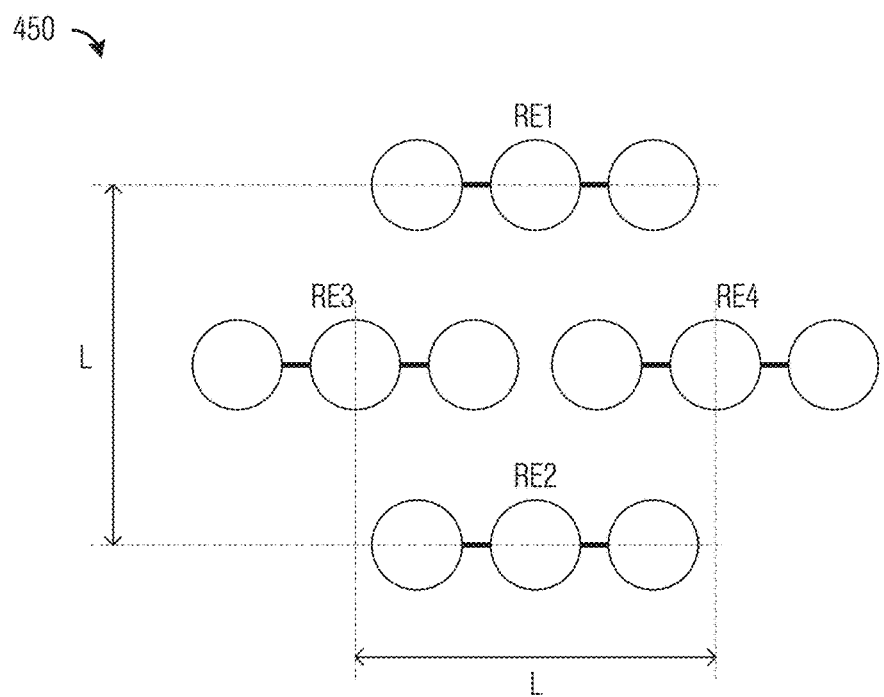
FIG. 4B illustrates a second example embodiment of an antenna system according to example embodiments described herein.

FIG. 4B illustrates a second example embodiment of an antenna system 450. Antenna system 450 includes four independent receive elements arranged in a rectangular shape, forming a planar array with all of the independent receive elements in a single plane. Each of the independent receive elements comprises an array of sub-elements to provide additional signal gain. As shown in FIG. 4B, each independent receive element includes an array of three sub-elements. However, other array sizes are possible. The four independent receive elements of antenna 450 are arranged in a configuration with a first pair oriented along a horizontal axis and a second pair oriented along an elevation axis, with each pair separated by a distance L. L may be specified in accordance with design criteria as described above, for example. Alternatively, each of the independent receive elements comprises a vertical stack (extending out of the plane of the planar array) of sub-elements, with each sub-element being a patch antenna.

Referring back now to Equation (2), the relative phases of $\vec{\beta} \cdot \vec{r}$ at the receive elements in the coordinate system relative to the center of receive element 1 (i.e., RE1 405 is used as the reference) are expressible as:

$$\vec{\beta} \cdot \vec{r}_1 = 0 \qquad (3)$$

$$\vec{\beta} \cdot \vec{r}_2 = -\beta_o L \sin\theta_E$$

$$\vec{\beta} \cdot \vec{r}_3 = -\beta_o \frac{L}{2}\cos\theta_E \sin\theta_H - \beta_o \frac{L}{2}\sin\theta_E$$

$$\vec{\beta} \cdot \vec{r}_4 = \beta_o \frac{L}{2}\cos\theta_E \sin\theta_H - \beta_o \frac{L}{2}\sin\theta_E.$$

where $\vec{r}_1 = 0\vec{x} + 0\vec{y} + 0\vec{z}$, $\vec{r}_2 = 0\vec{x} + 0\vec{y} - L\vec{z}$, $$\vec{r}_3 = \frac{-L}{2}\vec{x} + 0\vec{y} - \frac{L}{2}\vec{z}, \vec{r}_4 = \frac{L}{2}\vec{x} + 0\vec{y} - \frac{L}{2}\vec{z}$$

when the origin of coordinate system is the center of receive element 1. Therefore, since $\varphi_E = \beta_o L \sin\theta_E$ is the relative phase difference between the signals at receive elements 1 and 2, and $\varphi_H = \beta_o L \cos\theta_E \sin\theta_H$ is the relative phase difference between the signals at receive elements 3 and 4, Equation (3) may be re-written as:

$$\vec{\beta} \cdot \vec{r}_1 = 0 \qquad (4)$$

$$\vec{\beta} \cdot \vec{r}_2 = -\varphi_E$$

$$\vec{\beta} \cdot \vec{r}_3 = -\frac{\varphi_H}{2} - \frac{\varphi_E}{2}$$

$$\vec{\beta} \cdot \vec{r}_4 = \frac{\varphi_H}{2} - \frac{\varphi_E}{2}.$$

Figure 5A:
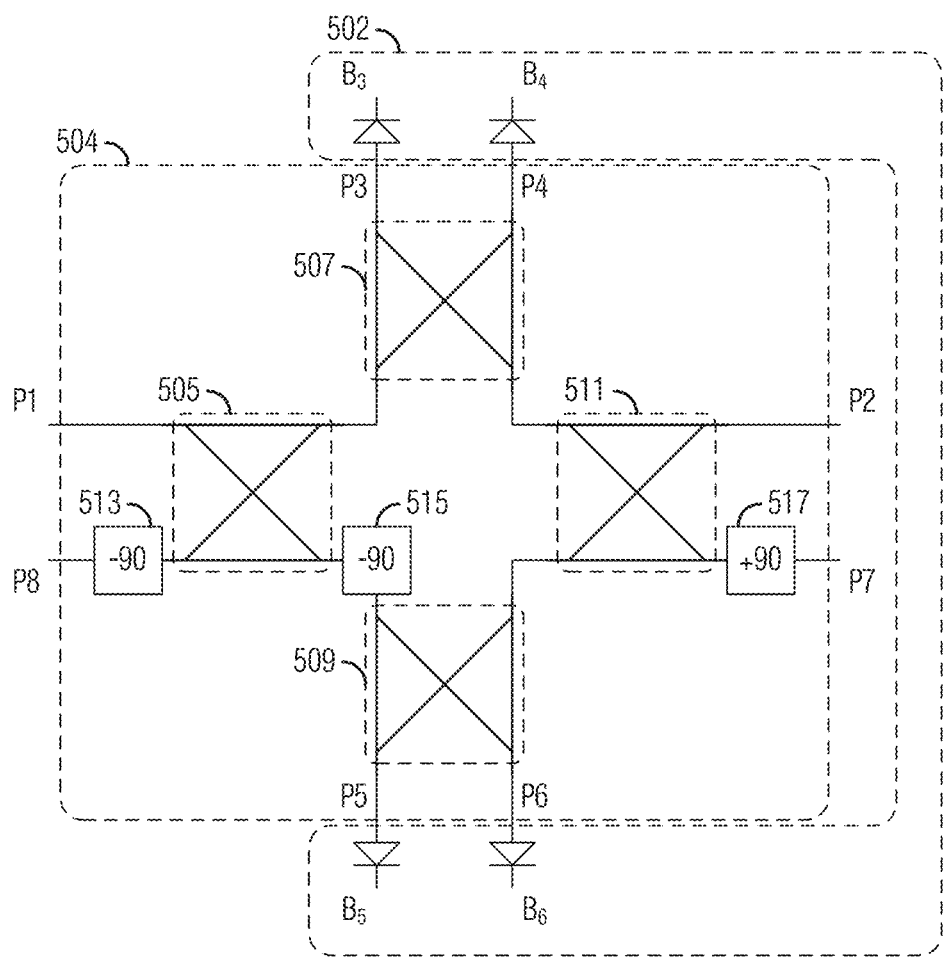
FIG. 5A illustrates a first example interferometer according to example embodiments described herein.

FIG. 5A illustrates a first example interferometer 500. Interferometer 500, in conjunction with antenna system 400 or antenna system 450, mixes the superposed signal components of the electromagnetic beam as received by the antenna system and produces output signals. Relative phases present in the signal components are maintained in the mixing and superposition. Interferometer 500 includes a mixing unit 502 and a passive junction 504. Mixing unit 502 includes a plurality of diode detectors for signal detection. Alternatively, transistor detectors may be used in mixing unit 502. Passive junction 504 includes four 90-degree hybrid couplers 505, 507, 509, and 511, and three phase shifters 513, 515, and 517, arranged in a configuration as shown in FIG. 5A. In general, a hybrid coupler transfers signals at their respective input ports to their respective output ports with a specified amplitude ratio and/or phase difference. As an illustrative example, for the 90-degree hybrid couplers of interferometer 500, a signal at an input port is divided equally between the two output ports with a 90 degree phase difference between the signals at the two output ports. Phase shifters 513, 515, and 517 may be implemented using unequal-length phase shifters, unequal-width phase shifters, or substrate integrated waveguide (SIW) phase shifters, for example. Interferometer 500 has four input ports (labeled P1, P2, P7, and P8), with each coupled to receive elements RE1, RE2, RE3, and RE4, respectively, of an antenna (such as antenna system 400 of FIG. 4A or antenna system 450 of FIG. 4B). Passive junction 504 of interferometer 500 is described with a scattering matrix having an identical magnitude relationship (i.e., a coupling ratio of input ports to output ports is identical for signals from all input puts) and a phase relationship expressible as:

$$\begin{cases} \angle 31 - \angle 38 = 2n\pi - \pi \\ \angle 31 - \angle 32 = 2n\pi + \pi/2 \\ \angle 31 - \angle 37 = 2n\pi + \pi/2 \end{cases} ; \begin{cases} \angle 41 - \angle 48 = 2n\pi + \pi \\ \angle 41 - \angle 42 = 2n\pi - \pi/2 \\ \angle 41 - \angle 47 = 2n\pi + \pi/2 \end{cases} ;$$

$$\begin{cases} \angle 51 - \angle 58 = 2n\pi \\ \angle 51 - \angle 52 = 2n\pi \\ \angle 51 - \angle 57 = 2n\pi + \pi \end{cases} ; \text{ and } \begin{cases} \angle 61 - \angle 68 = 2n\pi \\ \angle 61 - \angle 62 = 2n\pi - \pi, \\ \angle 61 - \angle 67 = 2n\pi \end{cases}$$

where n is an integer number, and $\angle ij - \angle il$ denotes the phase difference of input signals from input ports j and l at the output port i. The phase relationship of passive junction 504 is also expressible as:

$$\begin{cases} \angle 31 - \angle 38 = 2n\pi - \pi \\ \angle 31 - \angle 32 = 2n\pi + \pi/2 \\ \angle 31 - \angle 37 = 2n\pi + \pi/2 \\ \angle 38 - \angle 32 = 2n\pi - \pi/2 \\ \angle 38 - \angle 37 = 2n\pi - \pi/2 \\ \angle 32 - \angle 37 = 2n\pi \end{cases} ;$$

$$\begin{cases} \angle 41 - \angle 48 = 2n\pi + \pi \\ \angle 41 - \angle 42 = 2n\pi - \pi/2 \\ \angle 41 - \angle 47 = 2n\pi - \pi/2 \\ \angle 48 - \angle 42 = 2n\pi + \pi/2 \\ \angle 48 - \angle 47 = 2n\pi + \pi/2 \\ \angle 42 - \angle 47 = 2n\pi \end{cases} ;$$

$$\begin{cases} \angle 51 - \angle 58 = 2n\pi \\ \angle 51 - \angle 52 = 2n\pi \\ \angle 51 - \angle 57 = 2n\pi + \pi \\ \angle 58 - \angle 52 = 2n\pi \\ \angle 58 - \angle 57 = 2n\pi + \pi \\ \angle 52 - \angle 57 = 2n\pi + \pi \end{cases} ; \text{ and}$$

$$\begin{cases} \angle 61 - \angle 68 = 2n\pi \\ \angle 61 - \angle 62 = 2n\pi - \pi \\ \angle 61 - \angle 67 = 2n\pi \\ \angle 68 - \angle 62 = 2n\pi - \pi \\ \angle 68 - \angle 67 = 2n\pi \\ \angle 62 - \angle 67 = 2n\pi + \pi \end{cases} .$$

Using the received signal at port P1 of antenna 500 as a reference, the input signals to interferometer 500 may be expressed as:

$$P1 = A\cos(\omega t) = A\cos(\gamma_1) \quad (5)$$
$$P2 = A\cos(\omega t + \varphi_E) = A\cos(\gamma_2)$$
$$P7 = A\cos\left(\omega t + \frac{\varphi_H}{2} + \frac{\varphi_E}{2}\right) = A\cos(\gamma_7)$$
$$P8 = A\cos\left(\omega t - \frac{\varphi_H}{2} + \frac{\varphi_E}{2}\right) = A\cos(\gamma_8),$$

where A is a gain constant.

Outputs of 90-degree hybrid couplers 507 and 509 may be labeled P3, P4, P5, and P6. The signals at the outputs P3, P4, P5, and P6 are denoted $O_3$, $O_4$, $O_5$, and $O_6$, respectively, and are a combination of the input signals (Equation (5)) with specific phase shifts and are expressible as:

$$O_3 = \frac{A}{2}(-\cos(\gamma_1) + \cos(\gamma_8) - \sin(\gamma_2) - \sin(\gamma_7)) \quad (6)$$
$$O_4 = \frac{A}{2}(-\sin(\gamma_1) + \sin(\gamma_8) - \cos(\gamma_2) - \cos(\gamma_7))$$
$$O_5 = \frac{A}{2}(\cos(\gamma_1) + \cos(\gamma_8) + \cos(\gamma_2) - \cos(\gamma_7))$$
$$O_6 = \frac{A}{2}(\sin(\gamma_1) + \sin(\gamma_8) - \sin(\gamma_2) + \sin(\gamma_7)).$$

After passing through diode detectors and low pass filtering, the outputs of interferometer 500 are expressed as:

$$B_3 = K\frac{A^2}{4}(1+1+1+1-\cos(\gamma_1-\gamma_8)-\sin(\gamma_1-\gamma_2)-$$
$$\sin(\gamma_1-\gamma_7)+\sin(\gamma_8-\gamma_2)+\sin(\gamma_8-\gamma_7)+\cos(\gamma_2-\gamma_7))$$

$$B_4 = K\frac{A^2}{4}(1+1+1+1-\cos(\gamma_1-\gamma_8)+\sin(\gamma_1-\gamma_2)+$$
$$\sin(\gamma_1-\gamma_7)-\sin(\gamma_8-\gamma_2)-\sin(\gamma_8-\gamma_7)+\cos(\gamma_2-\gamma_7))$$

$$B_5 = K\frac{A^2}{4}(1+1+1+1+\cos(\gamma_1-\gamma_8)+\cos(\gamma_1-\gamma_2)-$$
$$\cos(\gamma_1-\gamma_7)+\cos(\gamma_8-\gamma_2)-\cos(\gamma_8-\gamma_7)-\cos(\gamma_2-\gamma_7))$$

$$B_6 = K\frac{A^2}{4}(1+1+1+1+\cos(\gamma_1-\gamma_8)-\cos(\gamma_1-\gamma_2)+$$
$$\cos(\gamma_1-\gamma_7)-\cos(\gamma_8-\gamma_2)+\cos(\gamma_8-\gamma_7)-\cos(\gamma_2-\gamma_7))$$

(Equation (7)), where K is the voltage gain of the diode detectors, which is assumed to be identical for all diode detectors. The outputs of interferometer 500 may be further simplified to:

$$BB_{34} = B_3 - B_4 = K\frac{A^2}{2}(\text{Sin}(\varphi_E) - \text{Sin}(\varphi_H)) \quad (8)$$

$$BB_{56} = B_5 - B_6 = K\frac{A^2}{2}(\text{Cos}(\varphi_E) - \text{Cos}(\varphi_H)),$$

where $BB_{34}$ is the difference of $B_3$ and $B_4$, and $BB_{56}$ is the difference of $B_5$ and $B_6$.

Figure 5B:
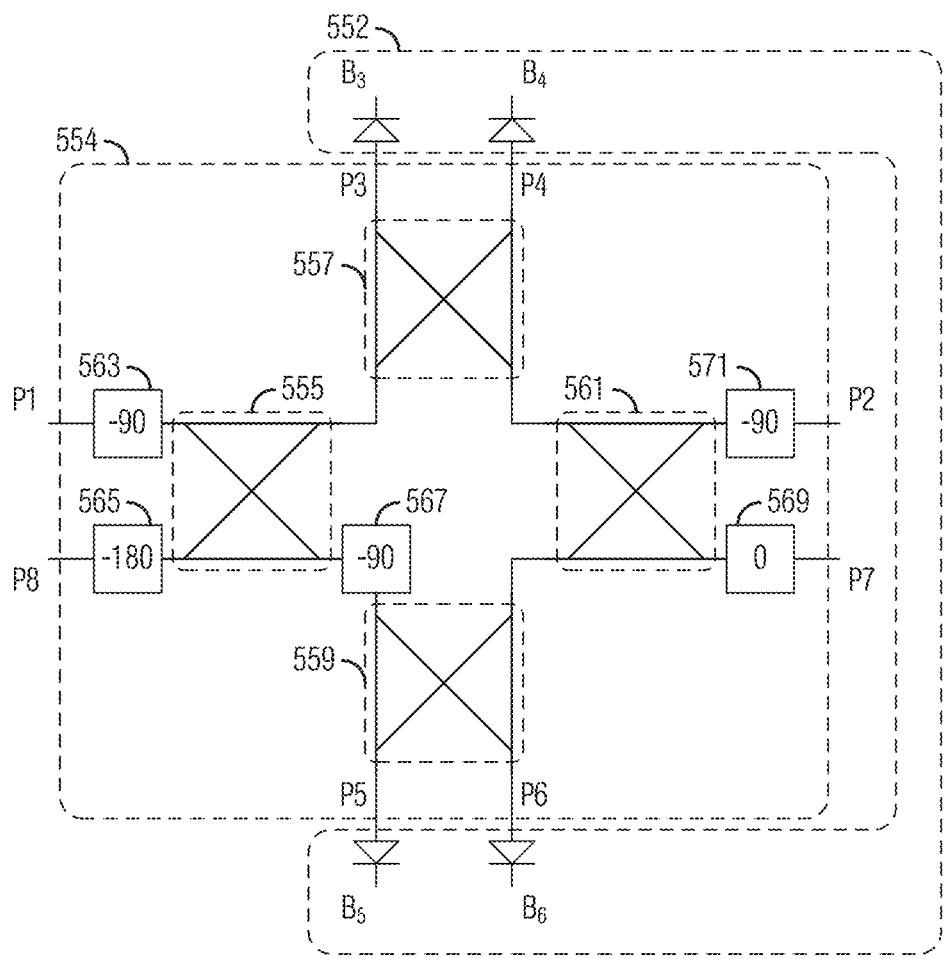
FIG. 5B illustrates a second example interferometer according to example embodiments described herein.

FIG. 5B illustrates a second example interferometer 550. Interferometer 550, in conjunction with antenna 400 or antenna 450, captures phase differences and/or changes in phase relationships present in a received electromagnetic beam. Interferometer 550 includes a mixing unit 552 and a passive junction 554. Mixing unit 552 includes a plurality of diode detectors. Alternatively, transistor detectors may be used in mixing unit 552. Passive junction 554 includes four 90-degree hybrid couplers 555, 557, 559, and 561, and five phase shifters 563, 565, 567, 569, and 571. Compared to interferometer 500, only the required phase shifting through the network is implemented in a different configuration of phase shifters. More specifically, the phase shift that the signals experience from the input ports (i.e. P1, P2, P7 and P8) to the output ports (P3, P4, P5, P6) is reduced by 90° in each branch while the relative phase difference between the branches is the same as the one through interferometer 500. Consequently, the output of the interferometer 550 with the input signals in (5) can also be expressed as in (6) by rotating each term through 90'. This, however, keeps the phase relationship unchanged, and hence the mixing product is identical to the one in (7). Indeed, the operating principle of the interferometer 550 remains the same as the interferometer 500, because the scattering matrix which determines the amplitude and phase relationship of the signals travelling through the input to output ports is identical in both configurations. Since the phase and amplitude relationships of the passive junctions of interferometer 500 and interferometer 550 are equal, the two interferometers are functionally equal. Depending on the application and frequency of operation, this interferometer can be implemented with different technologies and configurations. The interferometer 550 is generally easier to implement for wideband applications.

Figure 6:
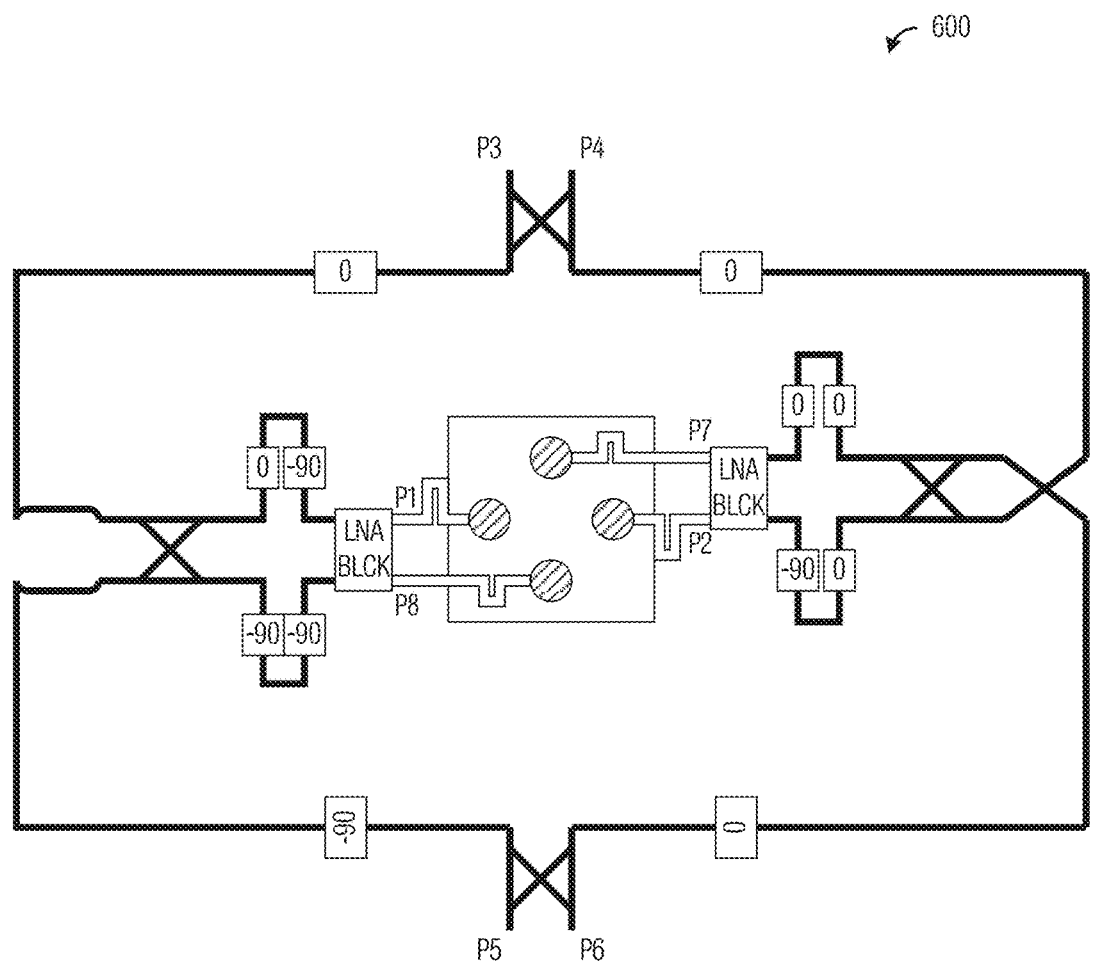
FIG. 6 illustrates a layout of the interferometer of FIG. 5B according to example embodiments described herein.

FIG. 6 illustrates a layout 600 of interferometer 550.

Figure 7:
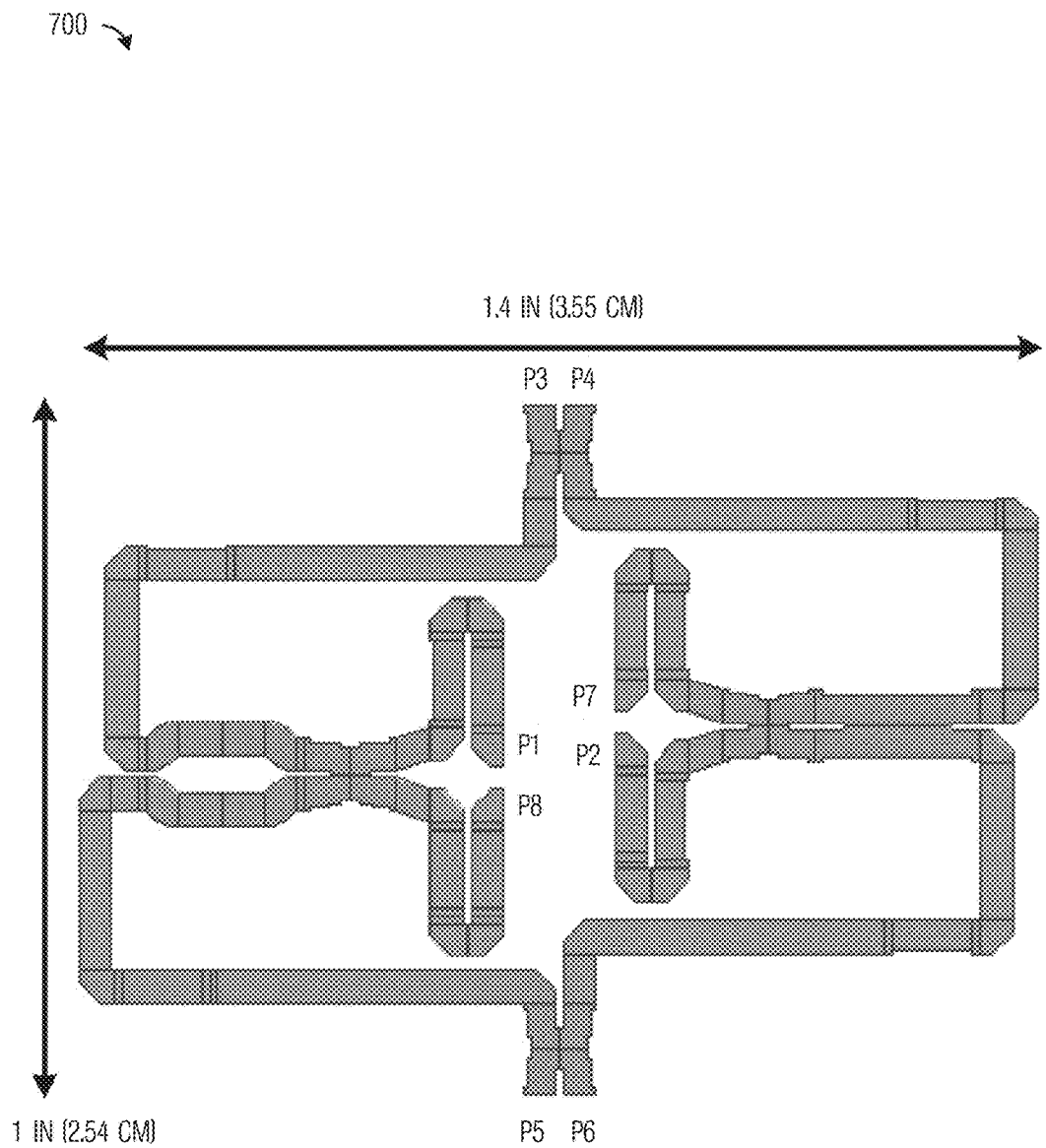
FIG. 7 illustrates a transmission line layout of the interferometer of FIG. 5B according to example embodiments described herein.

FIG. 7 illustrates a transmission line layout 700 of interferometer 550.

In order to estimate the DOA, a signal processing algorithm implemented in a signal processing unit may evaluate $BB_{34}$ and $BB_{56}$ of Equation (8). $BB_{34}$ and $BB_{56}$ may be re-written as shown below to highlight the relative phases of the signals:

$$BB_{34} = K\frac{A^2}{2}\left(\text{Cos}\left(\frac{\varphi_E + \varphi_H}{2}\right)\text{Sin}\left(\frac{\varphi_E + \varphi_H}{2}\right)\right) \quad (9)$$

$$BB_{56} = -K\frac{A^2}{2}\left(\text{Sin}\left(\frac{\varphi_E + \varphi_H}{2}\right)\text{Sin}\left(\frac{\varphi_E - \varphi_H}{2}\right)\right).$$

For discussion purposes, let x and y be defined as $x=(\varphi_E + \varphi_H)$ and $y=(\varphi_E - \varphi_H)$, then Equation (9) may be rearranged into:

$$x = 2\tan^{-1}\frac{-BB_{56}}{BB_{34}} = \beta_0 L(\sin\theta_E + \cos\theta_E \sin\theta_H) \quad (10)$$

$$y = 2\sin^{-1}\frac{BB_{34}}{K\frac{A^2}{2}\text{Cos}(x/2)} = \beta_0 L(\sin\theta_E - \cos\theta_E \sin\theta_H).$$

The component AOAs of the DOA may then be estimated using expressions:

$$\theta_E = \sin^{-1}\left(\frac{x+y}{2\beta_0 L}\right) \quad (11)$$

$$\theta_H = \sin^{-1}\left(\frac{x-y}{2\beta_0 L\cos\theta_E}\right).$$

There may be several sources of non-ideal behavior throughout the detection system that may cause erroneous estimations of the DOA. Additionally, differences in phase and gain of the antenna elements and low-noise amplifier (LNA) blocks, coupling ratios of the interferometer, the gain of the diode detectors, and the like, may be sources of error. Equation (7), which shows the relationship between the interferometer outputs $B_3$, $B_4$, $B_5$, and $B_6$ and the incoming signals, have been developed under an assumption of ideal phase and equal gain conditions, which may not be realistic in practice. Considering all of the sources of non-ideal behavior, it is possible to express each pair of detected signals $B_3$ and $B_4$ and $B_5$ and $B_6$ as:

$$\bar{B}_3 = kq_3\frac{A^2}{4}\begin{bmatrix}g_{13}g_{83}\alpha_1\alpha_8\\g_{13}g_{23}\alpha_1\alpha_2\\g_{13}g_{73}\alpha_1\alpha_7\\g_{83}g_{23}\alpha_8\alpha_2\\g_{83}g_{73}\alpha_8\alpha_7\\g_{23}g_{73}\alpha_2\alpha_7\end{bmatrix} \cdot \begin{bmatrix}-\cos(\gamma_1 - \gamma_8 - (\zeta_{13} - \zeta_{83}))\\-\sin(\gamma_1 - \gamma_2 - (\zeta_{13} - \zeta_{23}))\\-\sin(\gamma_1 - \gamma_7 - (\zeta_{13} - \zeta_{73}))\\+\sin(\gamma_8 - \gamma_2 - (\zeta_{83} - \zeta_{23}))\\+\sin(\gamma_8 - \gamma_7 - (\zeta_{83} - \zeta_{73}))\\+\cos(\gamma_2 - \gamma_7 - (\zeta_{23} - \zeta_{73}))\end{bmatrix},$$

$$\bar{B}_4 = kq_4\frac{A^2}{4}\begin{bmatrix}g_{14}g_{84}\alpha_1\alpha_8\\g_{14}g_{24}\alpha_1\alpha_2\\g_{14}g_{74}\alpha_1\alpha_7\\g_{84}g_{24}\alpha_8\alpha_2\\g_{84}g_{74}\alpha_8\alpha_7\\g_{24}g_{74}\alpha_2\alpha_7\end{bmatrix} \cdot \begin{bmatrix}-\cos(\gamma_1 - \gamma_8 - (\zeta_{14} - \zeta_{84}))\\+\sin(\gamma_1 - \gamma_2 - (\zeta_{14} - \zeta_{24}))\\+\sin(\gamma_1 - \gamma_7 - (\zeta_{14} - \zeta_{74}))\\-\sin(\gamma_8 - \gamma_2 - (\zeta_{84} - \zeta_{24}))\\-\sin(\gamma_8 - \gamma_7 - (\zeta_{84} - \zeta_{74}))\\+\cos(\gamma_2 - \gamma_7 - (\zeta_{24} - \zeta_{74}))\end{bmatrix},$$

$$\bar{B}_5 = kq_5\frac{A^2}{4}\begin{bmatrix}g_{15}g_{85}\alpha_1\alpha_8\\g_{15}g_{25}\alpha_1\alpha_2\\g_{15}g_{75}\alpha_1\alpha_7\\g_{85}g_{25}\alpha_8\alpha_2\\g_{85}g_{75}\alpha_8\alpha_7\\g_{25}g_{75}\alpha_2\alpha_7\end{bmatrix} \cdot \begin{bmatrix}+\cos(\gamma_1 - \gamma_8 - (\zeta_{15} - \zeta_{85}))\\+\cos(\gamma_1 - \gamma_2 - (\zeta_{15} - \zeta_{25}))\\-\cos(\gamma_1 - \gamma_7 - (\zeta_{15} - \zeta_{75}))\\+\cos(\gamma_8 - \gamma_2 - (\zeta_{85} - \zeta_{25}))\\-\cos(\gamma_8 - \gamma_7 - (\zeta_{85} - \zeta_{75}))\\-\cos(\gamma_2 - \gamma_7 - (\zeta_{25} - \zeta_{75}))\end{bmatrix}, \text{ and}$$

$$\bar{B}_6 = kq_6\frac{A^2}{4}\begin{bmatrix}g_{16}g_{86}\alpha_1\alpha_8\\g_{16}g_{26}\alpha_1\alpha_2\\g_{16}g_{76}\alpha_1\alpha_7\\g_{86}g_{26}\alpha_8\alpha_2\\g_{86}g_{76}\alpha_8\alpha_7\\g_{26}g_{76}\alpha_2\alpha_7\end{bmatrix} \cdot \begin{bmatrix}+\cos(\gamma_1 - \gamma_8 - (\zeta_{16} - \zeta_{86}))\\-\cos(\gamma_1 - \gamma_2 - (\zeta_{16} - \zeta_{26}))\\+\cos(\gamma_1 - \gamma_7 - (\zeta_{16} - \zeta_{76}))\\-\cos(\gamma_8 - \gamma_2 - (\zeta_{86} - \zeta_{26}))\\+\cos(\gamma_8 - \gamma_7 - (\zeta_{86} - \zeta_{76}))\\-\cos(\gamma_2 - \gamma_7 - (\zeta_{26} - \zeta_{76}))\end{bmatrix},$$

where q is the difference in detector's conversion loss with respect to an ideal conversion loss k, g is the difference in multi-port's coupling ratio with respect to an ideal coupling (i.e., 0.5), a is the difference in the gain of the antenna elements and the gain of the LNAs, $\zeta_{i,j}$ is the difference with the ideal desired phase difference in multiport network from port i to port j. Constant terms of $(kA^2/4)(1+1+1+1)$ in Equation (7) are not shown in above matrices to simplify the presentation of the matrices.

It has been shown that even small errors may result in very large errors in DOA estimation, thereby indicating a need for calibration of the detection system. Generally, these errors are constant in nature and typically do not vary randomly. Therefore, one time calibration is usually sufficient.

Under closer examination of the Equations presented herein, some of the terms presented in the Equations may be trimmed or merged together, as illustrative examples, $\gamma_1''\gamma_8 = -(\gamma_2-\gamma_7)$ and $\gamma_1-\gamma_7=(\gamma_8-\gamma_2)$. Therefore, the Equation for $B_3$ for example may be re-expressed as:

$$B_3 = -a_1 \cos(\phi_1+\Delta\zeta_1) - a_2 \sin(\phi_2+\Delta\zeta_2) - a_3 \sin(\phi_3+\Delta\zeta_3) + a_4 \sin(\phi_3+\Delta\zeta_4) + a_5 \sin(\phi_4+\Delta\zeta_5) + a_6 \cos(-\phi_1+\Delta\zeta_6).$$

When the error terms are small, it is possible to reformulate the expression for $B_3$ through Taylor series approximation as:

$$\overline{B}_3 = [(a_6-a_1)\cos(\phi_1)+(a_1\Delta\zeta_1-a_6\Delta\zeta_6)\sin(\phi_1)]+[(a_4-a_3)\sin(\phi_3)+(a_4\Delta\zeta_4-a_3\Delta\zeta_3)\cos(\phi_3)]+[-a_2\sin(\phi_2)-a_2\Delta\zeta_2\cos(\phi_2)]+[a_5\sin(\phi_4)+a_5\Delta\zeta_5\cos(\phi_4)].$$

Which may be simplified into $$\overline{B}_3 = H_3^T E_3,$$

where $H_3$ is a calibrated model for channel 3 and is expressible as $$H_3 = \begin{bmatrix} \cos(\varphi_1) \\ \sin(\varphi_1) \\ \sin(\varphi_3) \\ \cos(\varphi_3) \\ \sin(\varphi_2) \\ \cos(\varphi_2) \\ \sin(\varphi_4) \\ \cos(\varphi_4) \end{bmatrix}$$

and $E_3$ is a constant error vector for channel 3 and is expressible as $$E_3 = \begin{bmatrix} a_6 - a_1 \\ a_1\Delta\zeta_1 - a_6\Delta\zeta_6 \\ a_4 - a_3 \\ a_4\Delta\zeta_4 - a_3\Delta\zeta_3 \\ -a_2 \\ -a_2\Delta\zeta_2 \\ a_5 \\ a_5\Delta\zeta_5 \end{bmatrix}.$$

$E_3$ includes all error terms and may be estimated. As mentioned previously, the errors are constant in nature since they all originate from practical non-varying non-idealities in radio frequency (RF) front-end circuitry. Therefore, a least square (LS) technique may be applied in the estimation of the DOA in two dimensions, when a sufficient number of samples or measurement data after the fabrication of the detection device and assembly thereof is provided.

Figure 8:
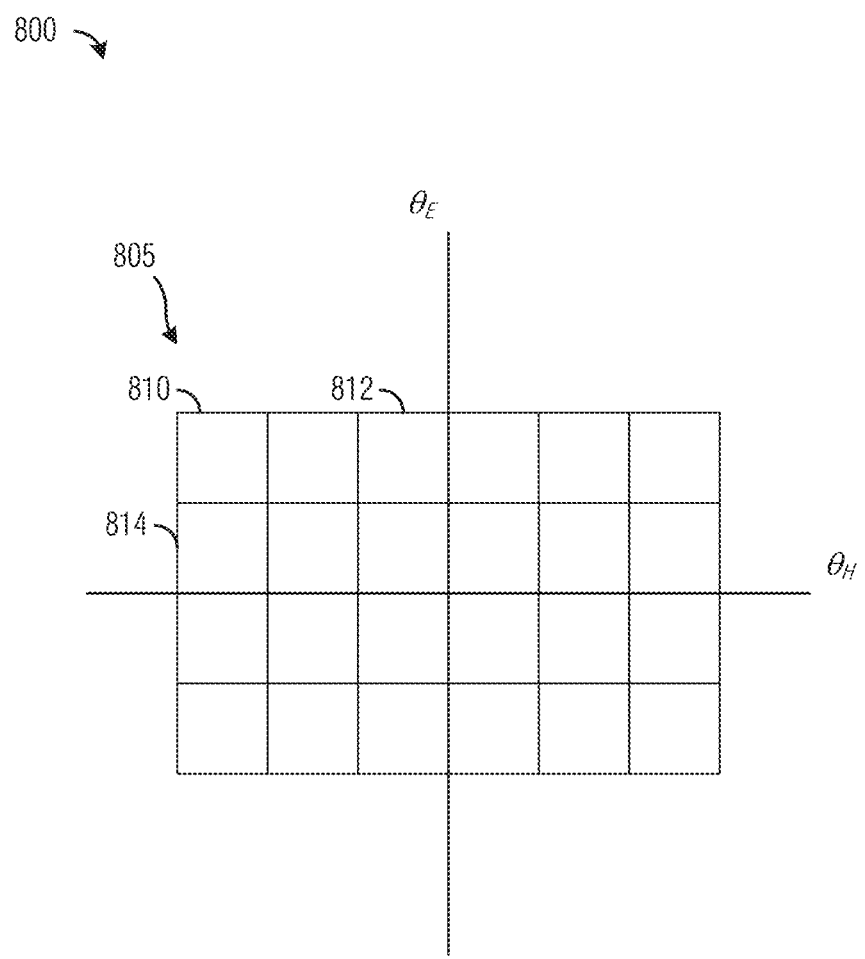
FIG. 8 illustrates an example partitioning of an operational range of angle detection according to example embodiments described herein.

The desired operational range of angle in both dimensions may be partitioned into a plurality of cells with predetermined elevation and azimuth angles. Therefore, for a given DOA, there is a corresponding cell. FIG. 8 illustrates an example partitioning 800 of an operational range of angles 805. Operational range of angle 805 is partitioned into a plurality of cells, such as cell 810, cell 812, and cell 814, where each cell represents a range of angles. A small number of measurement samples may be used to obtain a vector of $\overline{B}_3$ for each row of cells, such as a first row including cells 810 and 812 or a row including cell 814. The error vector $E_3$ is obtained from the vector of $\overline{B}_3$, using the LS technique, for example. For each cell there is a vector of $H_3$ and the corresponding scalar value of the vector of $\overline{B}_3$, where $\overline{B}_3$ includes scalar values for an entire row of cells. $E_3$ is a vector (with size of 8×1). When measurement is done for M nodes at M different angles in one dimension (e.g., elevation) but identical in the other angle (e.g., Horizontal), one vector of $\overline{B}_3$ (with the size of M×1) and a matrix of $\overleftrightarrow{H}_3$ (with the size of 8×M which actually includes M vectors of H3) would be obtained. The operations may be expressed as $$\overline{B}_3 = \overleftrightarrow{H}_3^T E_3$$

and $$E_3 = (\overleftrightarrow{H}_3^T \overleftrightarrow{H}_3)^{-1} \overleftrightarrow{H}_3^T \overline{B}_3.$$

As an illustrative example, the measurements for calibration are conducted with a fixed $\theta_E$ and sweeping $\theta_H$ over an entire operational range. Therefore, for each row, one vector of $\overline{B}_3$ may be obtained and hence one error vector of $E_3$. At the same time, measurement and error vectors for other channels (e.g., 4, 5, and 6) may be obtained. Thereafter, the stored error vectors ($E_3$, $E_4$, $E_5$, and $E_6$) and ideal models ($H_3$, $H_4$, $H_5$, and $H_6$) may be used for searching vectors ($\overline{B}_3$, $\overline{B}_4$, $\overline{B}_5$, and $\overline{B}_6$) that have a minimum difference (i.e., least square error) with the measured vectors ($\overline{B}_3$, $\overline{B}_4$, $\overline{B}_5$, and $\overline{B}_6$) for any angle detection. Knowledge of the exact values of A and K are not necessary since the error vectors are known and since the normalized models of $H_3$, $H_4$, $H_5$, and $H_6$ are used.

Figure 9:
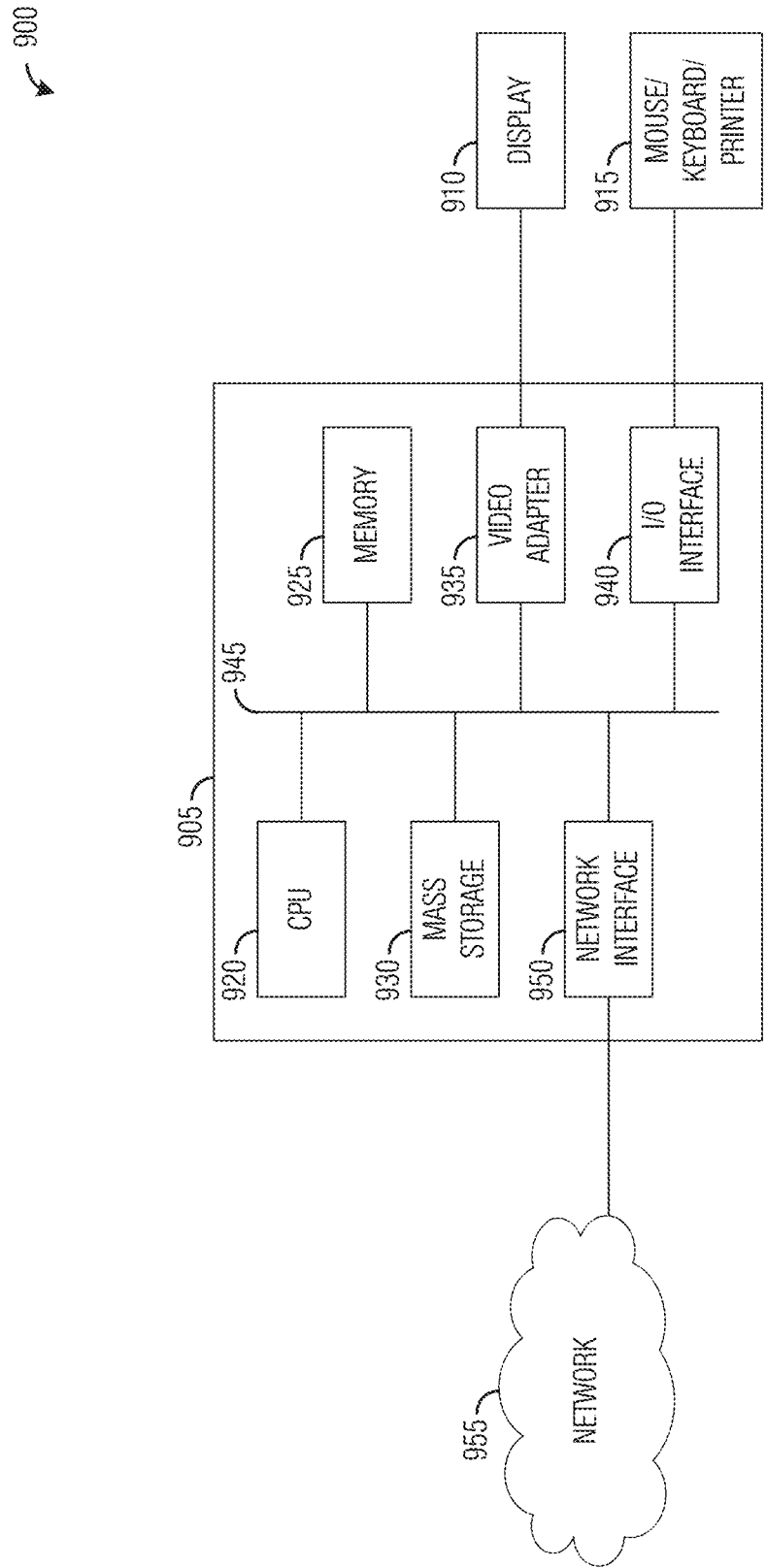
FIG. 9 is a block diagram of a processing system that may be used for implementing the devices and methods disclosed herein.

FIG. 9 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 905. Processing unit 905 may be equipped with one or more input/output devices, such as a human interface 915 (including speaker, microphone, mouse, touchscreen, keypad, keyboard, printer, and the like, for example), display 910, and so on. The processing unit may include a central processing unit (CPU) 920, memory 925, a mass storage device 930, a video adapter 935, and an I/O interface 940 connected to a bus 945.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 950, which may comprise wired links, such as an Ethernet cable or the like, and/or wireless links to access nodes or different networks 955. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A device for estimating a two-dimensional direction of arrival (DOA) of an electromagnetic beam, the device comprising:
an antenna system including four antenna elements forming a rectangular planar array and configured to receive four signal components of the electromagnetic beam;
an interferometer including a multiport passive junction, the multiport passive junction including a network of a plurality of hybrid couplers and a plurality of phase shifters and configured to couple and add phase shifts to the four signal components in accordance with a scattering matrix to produce four output signals; and
a signal processor coupled to the interferometer and configured to estimate the two-dimensional DOA of the electromagnetic beam based on the four output signals.

2. The device of claim 1, wherein the scattering matrix specifies a phase relationship between four input signals and the four output signals.

3. The device of claim 2, wherein the multiport passive junction further comprises input ports 1, 2, 7, and 8 and output ports 3, 4, 5, and 6, and wherein the phase relationship between the four input and the four output signals is determined according to:

$$\begin{cases} \angle 31 - \angle 38 = 2n\pi - \pi \\ \angle 31 - \angle 32 = 2n\pi + \pi/2 \\ \angle 31 - \angle 37 = 2n\pi + \pi/2 \end{cases} \quad \begin{cases} \angle 41 - \angle 48 = 2n\pi + \pi \\ \angle 41 - \angle 42 = 2n\pi - \pi/2 \\ \angle 41 - \angle 47 = 2n\pi - \pi/2 \end{cases}$$

$$\begin{cases} \angle 51 - \angle 58 = 2n\pi \\ \angle 51 - \angle 52 = 2n\pi \\ \angle 51 - \angle 57 = 2n\pi + \pi \end{cases} \text{; and } \begin{cases} \angle 61 - \angle 68 = 2n\pi \\ \angle 61 - \angle 62 = 2n\pi - \pi \\ \angle 61 - \angle 67 = 2n\pi \end{cases},$$

wherein n is an integer number, and $\angle ij - \angle il$ denotes a phase difference of input signals from input ports j and l of the multiport passive junction at an output port i of the multiport passive junction.

4. The device of claim 1, wherein the signal processor is configured to evaluate $$\theta_E = \sin^{-1}\left(\frac{x+y}{2\beta_0 L}\right)$$

$$\theta_H = \sin^{-1}\left(\frac{x-y}{2\beta_0 L \cos\theta_E}\right)$$

where $$x = 2\tan^{-1}\frac{-BB_{56}}{BB_{34}} = \beta_0 L(\sin\theta_E + \cos\theta_E \sin\theta_H)$$

$$y = 2\sin^{-1}\frac{BB_{34}}{K\frac{A^2}{2}\cos(x/2)} = \beta_0 L(\sin\theta_E - \cos\theta_E \sin\theta_H),$$

$BB_{34}$ is a difference between a first output signal of a first output port of the interferometer and a second detected output signal of a second output port of the interferometer, $BB_{56}$ is a difference between a third detected output signal of a third output port of the interferometer and a fourth detected output signal of a fourth output port of the interferometer, $\varphi_E = \beta_o L \sin\theta_E$, $\varphi_H = \beta_o L \cos\theta_E \sin\theta_H$, and $\theta_E$ are component angles of the two-dimensional DOA, $\beta = 2\pi f/c$, f is a frequency of the electromagnetic beam, c is the velocity of light, A is an amplitude of the electromagnetic beam, L is a distance between opposing antenna elements of the antenna system, and K is a voltage gain of diode detectors in the interferometer.

5. The device of claim 1, wherein the four antenna elements form a square planar array with opposing antenna elements spaced a distance L apart.

6. The device of claim 1, wherein a beam width of each of the four antenna elements is wider than an unambiguous range of DOA detection of the device, and wherein the device is capable of detecting a DOA within the unambiguous range of DOA detection of the device.

7. The device of claim 1, wherein the two-dimensional DOA comprises a first component angle of arrival (AOA) and a second component AOA, wherein the first component AOA and the second component AOA are relative to a plane defined by the four antenna elements.

8. The device of claim 7, wherein the first component AOA is an azimuth AOA and the second component AOA is an elevation AOA.

9. The device of claim 1, wherein each of the four antenna elements comprises a patch antenna.

10. The device of claim 1, wherein each of the four antenna elements comprises a plurality of patch antennas stacked along an axis orthogonal to a plane defined by the four antenna elements.

11. The device of claim 1, wherein each of the four antenna elements comprises a directional antenna.

12. The device of claim 1, wherein the interferometer further comprises a mixing unit configured to mix outputs of the multiport passive junction to produce the four output signals of the interferometer.

13. The device of claim 12, wherein the mixing unit comprises a plurality of detectors for signal detection.

14. The device of claim 1, wherein the four signal components and the four output signals of the interferometer are analog signals.

15. A method for estimating a two-dimensional direction of arrival (DOA), the method comprising:
receiving, by a device comprising a multiport passive junction, four signal components of an electromagnetic beam at an antenna system comprising four antenna elements forming a rectangular planar array;
producing, by the multiport passive junction of the device, four output signals by coupling and adding phase shifts to the four signal components in accordance with a scattering matrix; and
estimating, by the device, the two-dimensional DOA of the electromagnetic beam based on the four output signals, the two-dimensional DOA comprising an azimuth component angle and an elevation component angle.

16. The method of claim 15, wherein estimating the two-dimensional DOA of the electromagnetic beam comprises:
determining a first phase difference between a first pair of the four output signals;
determining a second phase difference between a second pair of the four output signals; and
estimating the two-dimensional DOA in accordance with the first phase difference and the second phase difference.

17. The method of claim 16, wherein estimating the two-dimensional DOA in accordance with the first phase difference and the second phase difference comprises evaluating $$\theta_E = \sin^{-1}\left(\frac{x+y}{2\beta_0 L}\right)$$

$$\theta_H = \sin^{-1}\left(\frac{x-y}{2\beta_0 L \cos\theta_E}\right)$$

where $$x = 2\tan^{-1}\frac{-BB_{56}}{BB_{34}} = \beta_0 L(\sin\theta_E + \cos\theta_E \sin\theta_H)$$

$$y = 2\sin^{-1}\frac{BB_{34}}{K\frac{A^2}{2}\cos(x/2)} = \beta_0 L(\sin\theta_E - \cos\theta_E \sin\theta_H),$$

where $BB_{34}$ is the first phase difference, $BB_{56}$ is the second phase difference, $\varphi_E = \beta_o L \sin\theta_E$, $\varphi_H = \beta_o L \cos\theta_E \sin\theta_H$, and $\theta_E$ are component angles of the two-dimensional DOA, $\beta = 2\pi f/c$, f is a frequency of the electromagnetic beam, c is the velocity of light, A is an amplitude of the electromagnetic beam, L is a distance between opposing antenna elements of the antenna system, and K is a voltage gain of signal detectors.

18. The method of claim 15, wherein the four signal components and the four output signals are analog signals.

19. A device for estimating a two-dimensional direction of arrival (DOA) of an electromagnetic beam, the device comprising:
an antenna system including four antenna elements forming a rectangular planar array and configured to receive four signal components of the electromagnetic beam;
a multiport passive junction coupled to the antenna system and comprising a network of a plurality of hybrid couplers and a plurality of phase shifters;
a processing unit; and
a computer readable storage medium storing programming for execution by the processing unit, the programming including instructions to
configure the multiport passive junction to produce four output signals by coupling and adding phase shifts to the four signal components in accordance with a scattering matrix; and
configure the device to estimate the two-dimensional DOA of the electromagnetic beam based on the four output signals, the two-dimensional DOA comprising an azimuth component angle and an elevation component angle.

20. The device of claim 19, wherein the programming further includes instructions to determine a first phase difference between a first pair of the four output signals, to determine a second phase difference between a second pair of the four output signals, and to estimate the two-dimensional DOA in accordance with the first phase difference and the second phase difference.

21. The device of claim 20, wherein the programming further includes instructions to evaluate $$\theta_E = \sin^{-1}\left(\frac{x+y}{2\beta_0 L}\right)$$

$$\theta_H = \sin^{-1}\left(\frac{x-y}{2\beta_0 L \cos\theta_E}\right)$$

where $$x = 2\tan^{-1}\frac{-BB_{56}}{BB_{34}} = \beta_0 L(\sin\theta_E + \cos\theta_E \sin\theta_H)$$

$$y = 2\sin^{-1}\frac{BB_{34}}{K\frac{A^2}{2}\cos(x/2)} = \beta_0 L(\sin\theta_E - \cos\theta_E \sin\theta_H),$$

where $BB_{34}$ is the first phase difference, $BB_{56}$ is the second phase difference, $\varphi_E = \beta_o L \sin\theta_E$, $\varphi_H = \beta_o L \cos\theta_E \sin\theta_H$, $\theta_H$ and $\theta_E$ are component angles of the two-dimensional DOA, $\beta_o = 2\pi f/c$, f is a frequency of the electromagnetic beam, c is the velocity of light, A is an amplitude of the electromagnetic beam, L is a distance between opposing antenna elements of the antenna system, and K is a voltage gain of signal detectors.

22. The device of claim 19, wherein the four signal components and the four output signals are analog signals.

23. A device for estimating a two-dimensional direction of arrival (DOA) of an electromagnetic beam, the device comprising:
an antenna system including four antenna elements forming a rectangular planar array and configured to receive four signal components of the electromagnetic beam;
an interferometer including a multiport passive junction, the multiport passive junction coupled to the four antenna elements and configured to add phase shifts to the four signal components prior to combining the four phase-shifted signal components to produce output signals of the interferometer, the multiport passive junction of the interferometer being characterized by a scattering matrix, the scattering matrix specifying a phase relationship between inputs of the multiport passive junction and outputs of the multiport passive junction; and
a signal processor coupled to the interferometer and configured to estimate the two-dimensional DOA of the electromagnetic beam based on the output signals of the interferometer.

* * * * *

UNITED STATES PATENT AND TRADEMARK OFFICE
CERTIFICATE OF CORRECTION

PATENT NO. : 10,401,467 B2
APPLICATION NO. : 14/835097
DATED : September 3, 2019
INVENTOR(S) : Jaber Moghaddasi et al.

Page 1 of 1

It is certified that error appears in the above-identified patent and that said Letters Patent is hereby corrected as shown below:

In the Claims

In Column 13, Line 59, Claim 3, delete "the four input and the four output signals" and insert --the four input signals and the four output signals--.

Signed and Sealed this
Fifth Day of November, 2019

Andrei Iancu
*Director of the United States Patent and Trademark Office*